United States Patent Office 2,937,438
Patented May 24, 1960

2,937,438

METHOD FOR JOINING ALUMINUM TO STAINLESS STEEL

Lloyd C. Lemon, Richland, Wash., assignor to the United States of America as represented by the United States Atomic Energy Commission No Drawing. Filed July 14, 1958, Ser. No. 748,549

2 Claims. (Cl. 29—488)

This invention relates to a method for joining aluminum to stainless steel. More particularly, it relates to a method for soldering aluminum to stainless steel without the use of flux to form a tenacious noncorrosive gastight bond therebetween.

Various methods for joining aluminum to aluminum or to dissimilar metals are presently known, such as brazing, welding, resin bonding, diffusion bonding, and soldering. However, there are inherent disadvantages or limitations in all of these methods. For example, brazing and welding call for high temperatures which soften or melt the aluminum which, in turn, causes distortion of the pieces to be joined. To braze or weld aluminum successfully, therefore, requires great skill on the part of the artisan. Diffusion bonding, which is carried out at high pressures and temperatures, likewise is conductive to distortion of the aluminum and, additionally, diffusion bonding often fails to effect a joint of sufficiently high strength. Resin bonding, which utilizes an organic adhesive at relatively low temperatures to join aluminum, also fails to provide a high strength joint. Soldering techniques for joining aluminum have been unsatisfactory in most cases due to the reluctance of aluminum to solder well, particularly to dissimilar metals. All of the methods that have been developed for joining aluminum by soldering require special aluminum solders, which are alloys that are usually rich in zinc and tin. In one presently practiced soldering method for aluminum, the pieces to be joined are heated and butted together while a bar of aluminum solder is rubbed along the surfaces to be soldered. As the pieces heat up to the melting point of the solder, the oxide film on the aluminum pieces softens and is scraped away by the rubbing of the solder against the aluminum pieces; when the aluminum pieces reach the temperature at which the solder melts, therefore, the solder is in intimate contact with cleansed portions of the aluminum pieces and will alloy therewith to join the aluminum pieces. This method of joining aluminum may be used when the surfaces to be joined are accessible for rubbing by the artisan while applying solder to the surfaces to be joined. However, when the surfaces to be joined are inaccessible, rubbing while applying solder to keep the surfaces to be joined free from oxide is not possible and a flux must be used. Fluxes for soldering usually contain salts which unavoidably become occluded in the soldered joint and which in the presence of moisture cause corrosion and destruction of the joint by electrolytic action. It is desirable, therefore, to avoid the use of fluxes in the soldering of aluminum.

As mentioned previously, one of the most difficult metallurgical tasks has been the soldering of aluminum to dissimilar metals. Aluminum and alloys thereof can be soldered to dissimilar metals by various presently known methods with varying success, depending to a great extent on the nature of the metal to which the aluminum is sought to be soldered. In some cases it has been found necessary to first electroplate aluminum with copper in order to solder the aluminum tenaciously to the dissimilar metal. Understandably, copper electroplating of aluminum is time-consuming and expensive. This being so, it is appreciated that a method of soldering aluminum tenaciously to a dissimilar metal which does not require electroplating with copper as a preliminary step in the soldering process would be a substantial contribution to the metallurgical art.

Prior to the present invention, one of the most difficult metals to join satisfactorily to aluminum by soldering was stainless steel. There are many different alloys of steel that are referred to as stainless steel, the most common types being steel with a low carbon content, usually, and containing 18% chromium by weight, or 18% chromium and 8% nickel by weight, the latter being commonly called 18-8 stainless steel. Generally, fluxing with zinc chloride-ammonium chloride containing hydrochloric acid, or orthophosphoric acid flux, is necessary before applying solder to stainless steel surfaces that are to be joined by soldering if a satisfactory bond is to be achieved. As mentioned previously with reference to aluminum soldering, the unavoidable occlusion of flux in the soldered joint gradually corrodes and destroys the joint in the presence of moisture by electrolytic action. A method of soldering stainless steel without the use of flux would, therefore, also be highly desirable.

The method of the present invention now makes it possible to join aluminum to stainless steel at low temperatures, which will not distort the pieces to be joined, by soldering without the use of flux which in the presence of moisture will cause gradual corrosion and destruction of the joint by electrolytic action.

It is an object of the present invention to provide a method for joining aluminum to stainless steel to form a high strength bond therebetween.

Another object of the present invention is to provide a method for joining aluminum to stainless steel which will not cause distortion of the aluminum and stainless steel.

A further object of the present invention is to provide a method for joining aluminum to stainless steel by soldering without the use of flux thereby precluding corrosion of the solder joint in the presence of moisture.

Still another object of the present invention is to provide a method for joining aluminum to stainless steel by soldering which does not require electroplating the aluminum or stainless steel.

It is also an object of the present invention to provide a method of joining aluminum to stainless steel which is rapid and economical.

These and other objects are accomplished by the present invention through cleaning the aluminum and stainless steel, tinning the aluminum with aluminum solder, tinning of the steel with lead-tin solder, and sweating the tinned portions of the aluminum and stainless steel together.

In accordance with the teachings of the present invention, the aluminum to be joined is coated with an aluminum solder adapted to alloy with aluminum and with a lead-tin solder, the stainless steel is coated with a lead-tin solder, and then the solder-coated aluminum and stainless steel are brought together with the soldered surfaces in contact and heated to alloy the aluminum solder to the lead-tin solder.

In a preferred embodiment of the present invention, the aluminum to be joined is cleaned and roughened with an abrasive material, such as emery, after which it is thoroughly washed with trichloroethylene. The aluminum is then heated to about 650° F. while applying aluminum solder without the use of any flux to the bond area. There are many suitable aluminum solders, but preferably the solder is one consisting essentially of tin with minor proportions of silver and lead. A solder which has been found to be particularly satisfactory is one consisting by weight, of approximately 1% Ag, 0.01% Al, 0.01% Cu, 1% Fe, 1% Pb, 0.1% Si, and the balance Sn. The stainless steel to be joined is also cleaned and roughened with an abrasive material, such as emery. After abrading, the stainless steel is thoroughly washed successively with trichloroethylene and 50% concentration hydrochloric acid. After washing, the stainless steel is heated to about 450° F. while applying a lead-tin solder to the bond area without the use of flux. Preferably the lead-tin solder consists of approximately equal proportions of lead and tin, but the proportions can vary widely within the range of lead-tin solders known to be suitable as solders for stainless steel. The aluminum and stainless steel, after they have been tinned, are then brought together in the orientation that they are to be joined and are heated with an oxyacetylene flame to a temperature of 500–600° F. at which temperature the tinned surfaces will alloy. Upon cooling, the aluminum and stainless steel are found to be firmly and tenaciously bonded; additionally, the joint may be subjected to moisture or water flow without any danger of corrosion since a gastight bond having no occluded flux has been effected.

The method of the present invention has many obvious applications. For example, in the temperature measurement of fuel elements in nuclear reactors it is necessary to join a thermocouple which is jacketed with stainless steel to a fuel element which is jacketed with aluminum. Another obvious application of the present invention is the lining of an aluminum tank for chemical processing with stainless steel to obtain the economy of aluminum as the structural material and the noncorrosiveness of stainless steel as the contact material. Another familiar application is the joining of aluminum handles to utensils having functional portions made of stainless steel.

Although the method disclosed herein has been described by way of a preferred embodiment, it is intended to limit the invention only by the scope of the appended claims.

What is claimed is:

1. A method for joining aluminum to stainless steel comprising abrading said aluminum, washing said aluminum with trichloroethylene, heating said aluminum to about 650° F. while applying a solder consisting of approximately 1% Ag, 0.01% Al, 0.01% Cu, 1% Fe, 1% Pb, 0.1% Si, and the balance Sn to a portion thereof, abrading said stainless steel, washing said stainless steel successively with trichloro-ethylene and 50% concentration hydrochloric acid, heating said stainless steel to about 450° F. while applying a solder consisting of approximately 50% lead and 50% tin to a portion thereof, contacting said aluminum and stainless steel at the portions to which solder has been applied, and heating said aluminum and stainless steel while so contacted to between 500–600° F.

2. A method for joining aluminum to stainless steel comprising abrading said aluminum, chemically cleaning said aluminum, heating a portion of said aluminum, tinning said heated portion with a solder consisting essentially of 1% silver, 1% lead, and the balance tin, abrading said stainless steel, chemically cleaning said stainless steel, heating a portion of said stainless steel, tinning said heated portion with a tin-lead solder, contacting said aluminum and stainless steel at the portions so tinned, and heating said aluminum and stainless steel while so contacted to between 500–600° F.

References Cited in the file of this patent
UNITED STATES PATENTS

| | | |
|---|---|---|
| 2,698,813 | Koh | Jan. 4, 1955 |
| 2,798,843 | Slomin et al. | July 9, 1957 |
| 2,824,365 | Erickson | Feb. 25, 1958 |